United States Patent

Afsenius

[11] Patent Number: 6,121,601
[45] Date of Patent: Sep. 19, 2000

[54] NIGHT VISION GOGGLES, WHERE FOCUSING AND POWER SUPPLY ARE HANDLED WITH JOINT HANDLE

[75] Inventor: Sven-Åke Afsenius, Lidingö, Sweden

[73] Assignee: Simrad Optronics A/S, Oslo, Norway

[21] Appl. No.: 09/077,932

[22] PCT Filed: Oct. 17, 1996

[86] PCT No.: PCT/SE96/01322

§ 371 Date: Jun. 5, 1998

§ 102(e) Date: Jun. 5, 1998

[87] PCT Pub. No.: WO98/16859

PCT Pub. Date: Apr. 23, 1998

[51] Int. Cl.[7] .................................................. H01J 40/14
[52] U.S. Cl. ................................ 250/214 VT; 250/201.4
[58] Field of Search ...................... 250/214 VT, 214 R, 250/214 A, 207, 214 LA, 214 LS, 201.2, 201.4; 313/103 R, 103 CM

[56] References Cited

U.S. PATENT DOCUMENTS

| | | |
|---|---|---|
| 4,554,744 | 11/1985 | Huckenbeck. |
| 5,130,527 | 7/1992 | Gramer et al. .................... 250/214 VT |
| 5,158,358 | 10/1992 | Maglica et al. .......................... 362/206 |
| 5,204,774 | 4/1993 | Owen, Jr. et al. ...................... 359/418 |
| 5,345,370 | 9/1994 | Murray et al. .......................... 362/205 |
| 5,347,119 | 9/1994 | Connors ........................... 250/214 VT |
| 5,760,953 | 6/1998 | Task et al. .............................. 359/409 |

*Primary Examiner*—Que T. Le
*Attorney, Agent, or Firm*—Young & Thompson

[57] ABSTRACT

A night-viewing light amplifying viewer with a battery voltage driven light amplifier, operation of the focusing control and the electrical on/off-switch for the light amplifier being united to take place by the same operating device of suitably chosen dimensions.

14 Claims, 2 Drawing Sheets

NIGHT VISION GOGGLES, WHERE FOCUSING AND POWER SUPPLY ARE HANDLED WITH JOINT HANDLE

BACKGROUND OF THE INVENTION

The invention relates to a night vision light amplifying viewer with a battery voltage driven light amplifier and where the operation of the focusing control (lens) and the electrical on/off-switch, and possibly further functions, are joined so that they take place by means of a single common operating device.

The invention thereby solves the problem of providing both good manipulation of operating devices and low weight and volume of the light amplifying viewer.

DESCRIPTION OF THE RELATED ART

A primary constructional objective for portable light amplifying viewers is to reduce weight and size and at the same time simplify their practical handling. This concerns in particular (but not only) so-called night viewer goggles, usually called goggles, which preferably are mounted in front of the eyes on a helmet or a supporting mask which leaves the hand free for other tasks during night observations. In order to handle such an instrument a number of control devices are usually required, among other things a focusing control for the lens, and an electrical on/off-switch for the light amplifier (and possibly IR-diodes for artificial illumination of the scene in near infared light).

Such light amplifying viewers are known from the patents U.S. Pat. No. 4,463,252 and SE-450 671, and we refer to the latter of these two patents for a more detailed description of the available light amplifying viewer categories and further references.

Traditionally, in this connection focusing and on/off-switching usually takes place with separate operating devices. Focusing occurs usually in that a lens, which is free and which is pointing in the direction towards the scene being observed, is rotated around its axis of symmetry, such as occurs on normally available commercial cameras, while on/off-switching is by means of separate rocker, twist or push switches with operating devices of varying appearance.

But as more compact light amplifying viewers are constructed and are available (SE-450 671) with short forwardly directed construction length, achieved through the beam path between the light amplifier and the scene being watched being bent by means of mirror elements, and where the lens normally is no longer equally accessible for focusing according to the above described method, the question occurs how focusing can suitably take place.

Operating can, on one hand, take place by means of, for example, a knob or handle of dimensions so well chosen that the user can easily find and grip it even under difficult night outside conditions, and where the "goggles" are mounted closely in front of the eyes where it is not possible to visually localize the operating device as a guide for the hand movements.

On the other hand, the present miniaturizing evolution of these light amplifying viewers means that the size and weight of the control means in relation to the total instrument become more significant, and even compromising. The balance between, on one hand, large "knobs" for simple and quick handling and, on the other hand, low weight/volume for easy portability therefore becomes more and more problematic. The problem can also be expressed so that while it naturally is important to reduce the weight and volume of these (preferably) head-mounted light amplifying viewers, the size of the operating devices should rather increase or at least not be reduced below a certain size, which is dictated by the invariable hand size of the operators.

SUMMARY OF THE INVENTION

A main object of the invention is therefore to help to find a possibility to avoid or at least minimize these system inconveniences in accordance with the following:

As in general the operation of a control knob/handle is simplified by increasing size, a generous size of the same knob/handle should be aimed at as far as possible, but on the other hand it should be designed so that more than one function is assigned to and controlled via the same operating device. In this way the total number of knobs, handles and the like on the instrument, and thereby the total weight and volume, can be reduced at the same time as satisfactory operation of the remaining control(s) can still be achieved.

Yet another advantage is obtained through: in accordance with the invention, the user does not need to change handgrip when he performs different control measures, a particularly significant advantage for the head-mounted goggles, where at night in order to guide the movements of the hands—it is not possible to see the different operating devices and where one therefore must consequently instead "feel about" the instrument to localize the different "knobs" and the like. It is especially advantageous to combine the two most important and most frequently used control functions, i.e. the on/off-switch with the focusing control.

As it is no longer required to change the handgrip between the on/off-switch and the focusing handle, the reaction time is reduced. Therefore it is quicker to begin and to finish a light amplifying operation, an advantage which is especially valuable during fast courses of events, for example, when the light amplifying viewer is designed and intended for use on a weapon, viz. as a night sight.

A non-limiting example of how such a control device with two or more functions can be designed is presented as follows:

the light amplifying viewer is provided with a well-sized knob projecting from the instrument;

in a first rotation it functions as on/off-switch with a marked friction position in the off-position so that the user "feels" when the light amplifying viewer is switched on;

the instrument is thereafter switched on but not focused. Through then further turning the knob in the same direction, focusing towards the desired scene occurs.

The switch function integrated with the knob functions according to generally known and well tested technology, i.e. through the current circuit between the battery and the light amplifier being broken when one turns the knob from the switch position "on" to the position "off" (turn switch).

On the other hand, the focusing function occurs in such a way that during continued rotation (after having switched it on), the knob runs, for example, in a thread (also other well known mechanical solutions can be applied) and is thereby displaced axially. By means of a suitable mechanical transmission from the knob to the lens—most easily designed as a rigid shaft—the lens or suitable parts thereof are thereby brought to be moved axially resulting in that lens focusing takes place towards the stationary light amplifier, all this according to tested and well-known mechanical and optical principles.

The design of the multifunction knob/device can also take place in a number of alternative ways, for example so that one switches on/off through pushing on the combined knob (push switch) while focusing still takes place through twisting. It is thereby possible to optionally, if necessary, even include other on/off switch functions in the knob so that—for example—the operator can furthermore switch on/off the above mentioned IR-light diode.

As stated earlier, the main object of the invention is, in compact and (usually) head-borne night vision goggles or light amplifying viewers, to combine several functions in the same control device so that the number of these knobs, handles and the like is reduced and thus lower total weight and volume are achieved at the same time as the manageability is kept acceptable or improved.

A further optional development step without leaving the inventive concept and within the scope of the same invention is therefore exemplified by the following non-limiting description of the construction.

The (for reasons of manageability) large focusing and on/off-knob contains usually an unused space inside the knob which more suitably and more effectively can be used according to the following:

In the normal case that the light amplifying viewer is powered by a suitable commercial battery (e.g,. an AA-cell or smaller), it is possible to situate the same battery—completely or partly—inside the above described control knob, the dimension of which in this case, if necessary, and without disadvantage can be adapted and increased to geometrically fit around the selected battery. The shape and size of the operating device can thereby be modified according to necessity and is normally made comfortably large and manageable for the operator at the same time as a further total reduction of the volume and weight of the instrument is also possible, since the battery holder and the battery (alternatively) still must be housed somewhere else in the structure of the instrument.

The functions of the focusing knob are therefore further increased according to the invention, viz. through the earlier described on/off-function and now furthermore to a battery holder with a lid for changing batteries. The physical closeness between the battery and the on/off-current switch function shortens and simplifies the wiring and makes the arrangement attractive also in several ways:

Battery changes can—for example—take place through a lid on the end of the knob or through the whole knob being removed. By changing the appearance of the knob, furthermore, different battery types can be used without the rest of the construction of the light amplifying viewer being affected at all, a flexibility which is often aimed at.

BRIEF DESCRIPTION OF THE DRAWINGS

The invention will now be described on the basis of the non-limiting embodiments shown in FIGS. 1, 2 and 3.

DESCRIPTION OF THE PREFERRED EMBODIMENTS

Figure 1:
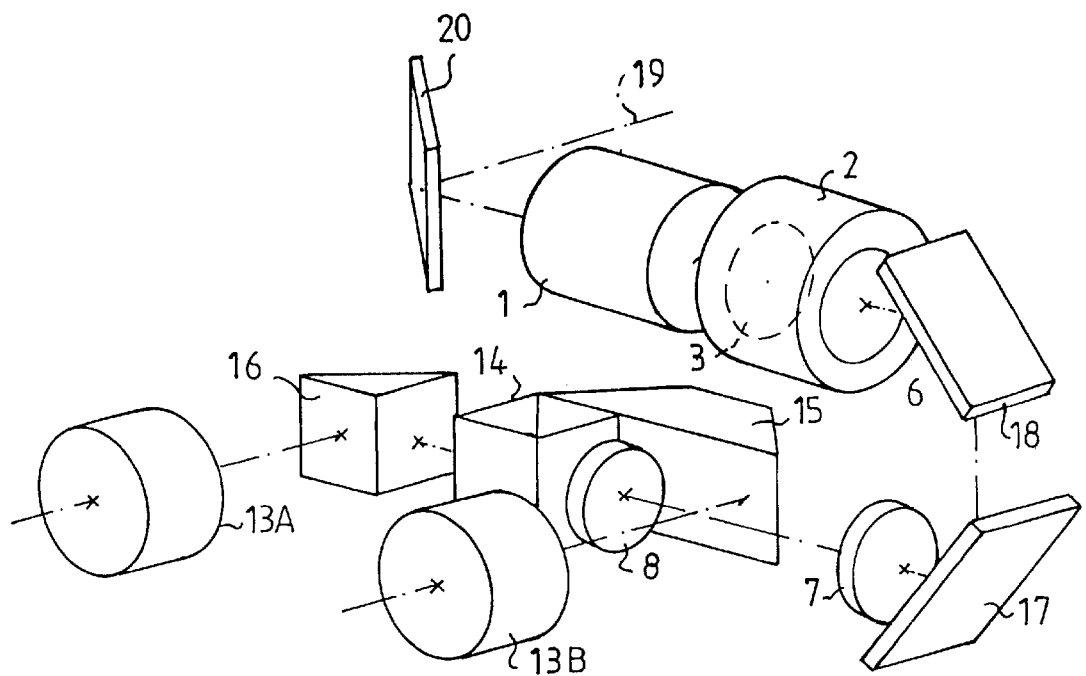
FIG. 1 exemplifies binocular light amplifying goggles according to the preamble and FIG. 3 shows how the invention can be applied in this case.

Light amplifying goggles according to FIG. 1 have been taken from the Swedish Patent 450 671 according to the following generic description.

It consists (FIG. 1) of a light amplifier 2 oriented perpendicular to the observation direction 19. The lens 1, which projects a picture of the scene on the photocathode 3 of the light amplifier, is here also oriented coaxially in the same direction and looks therefore (at right angles) out towards the viewed scene 19 via the mirror element 20. By the side and under the light amplifier 2 there is an observation microscope with a beam divider 14, collimation lenses 7,8 and prisms/mirrors 15,16,17,18 and two eyepieces 13A and 13B, through which the light-amplified scene 6 presented on the light amplifier is viewed. For a more detailed description, reference is made to the relevant patent document.

Figure 3:
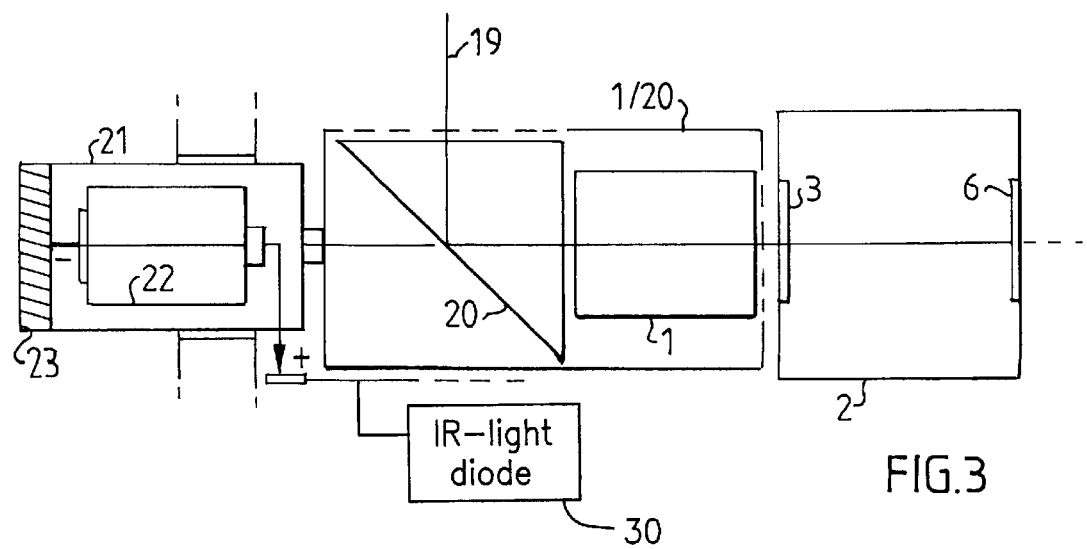

Focusing of lens 1 (FIG. 3) can now take place by axial displacement of said lens, preferably together with the mirror/prism 20, together forming a physical unit 1/20. A suitable arrangement is to provide here, coaxially with the lens 1, a rotatable knob 21, which by means of threading or the like is made to move axially in the direction towards/away from the light amplifier 2. By means of generally known technology and suitable geometry and adjustment, this knob can be brought into mechanical contact with the lens module 1/20 which thereby is made to follow the knob in its axial movements, whereupon focusing is obtained on the stationary light amplifier 2 according to known optical principles.

According to the invention the focusing knob 21 is now shaped so that in one end position it functions as an on/off-switch instead, which, for example, is arranged so that the current circuit between two mutually resilient electrical contact points or foils is broken when the knob 21 is moved (axially)(i.e. rotated) outside a certain interval. In this way the rotation movement of knob 21 controls power to the light amplifier 2 and, optionally, to an IR-light diode 30.

What is more, according to a preferred embodiment there is the alternative to house a battery 22 completely or partially in the same operating device 21, so that its function is thereby increased further so as to function as a battery holder with an openable lid 23, wherethrough battery changes can take place.

The presented description of the invention refers (above) preferably to light amplifiers of so-called goggles type for mounting on the head of the operator, where the advantages are especially prominent, but the invention is in no way limited to this application. Also for other light amplifying viewers it is advantageous to apply the invention, for example, on light weapon sights with light amplifiers for use in the dark.

Figure 2:
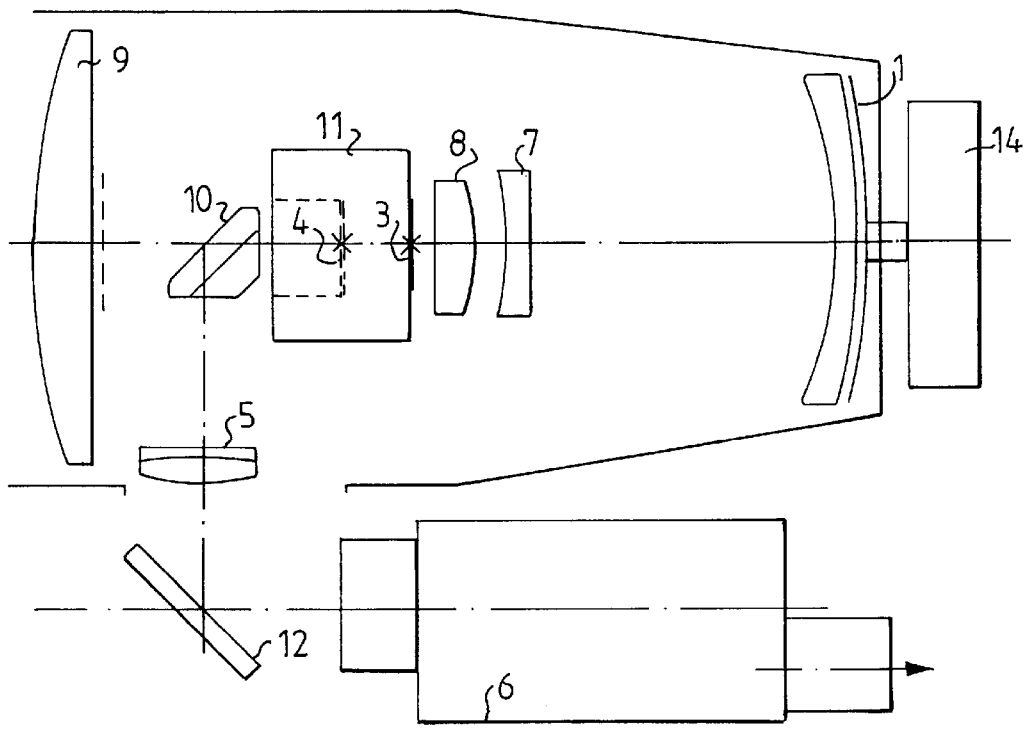
FIG. 2 illustrates instead how the invention can be applied on a monocular light amplifying viewer.

As a non-limiting example of this, the invention will now be described on the basis of the configuration according to FIG. 2, showing an optical construction principle according to the patent WO 85/00433 for such a special light amplifying viewer with a magnification of one, intended to be applied on top of different optical daylight instruments, thereamong telescopic sights, resulting in that the telescopic sight obtains night capacity. Here follows a description of the system in summary.

The light amplifying viewer according to FIG. 2 has a lens consisting of lens 9 and exactly one mirror 1, followed by the field lenses 7 and 8, which together focus a picture of the observed scene on the photocathode 3 of a light amplifier 11, which electronically amplifies the picture and thereafter presents a bright picture on the screen 4. The rays from this picture are collimated by a collimator/eyepiece lens 5 via suitable mirroring optical components 10 out to the beam dividing mirror 12, which defines the egress out of the light amplifying viewer/sight and deflects the parallel light backwardly in the direction towards the telescopic sight 6, whereby one consequently with amplification, on one hand, observes the light-amplified scene 4 and furthermore (simultaneously) the natural scene (without light amplification) as a look-through, through the same beam divider 12. (For more detailed information, reference is made to the relevant patent document.)

The usual way of focusing the lens (FIG. 2) is by means of axial displacement of the lens mirror 1 and this is practically performed by means of rotation of a focusing knob 14 on the rear side of the instrument and which by means of a mechanical transmission shifts the mirror back and forth.

This focusing knob can according to the invention be provided with an on/off-switch according to the earlier description so that a doubled function of this operating device is obtained, resulting in among other things that the shooter by one and the same handgrip can switch on and focus the instrument, with the consequential reduction of reaction time in the opening of fast night operations.

It should be noted that the invention can be varied in a plurality of ways according to the submitted claims so that the two examples of application mentioned here in no way limit the validity of the invention in other light amplifying viewer configurations.

In the claims (below) reference is made to the application example according to FIG. 1, but the application example according to FIG. 2 could equally well have been used for the same purpose.

What is claimed is:

1. A light amplifying viewer comprising:
   an electrically powered light amplifier with an input plane and an output plane;
   a lens (1) arranged for projecting a scene on the input plane;
   one or more eyepieces positioned in optical alignment with the output plane; and
   a rotatable operating device for adjusting the focus of the lens, for supplying power to the light amplifier, and for housing at least one battery and a switch,
   wherein the rotatable operating device includes a position where the switch has a breaking position, and the rotation of the operating device beyond the breaking position serves to adjust the focus of the lens.

2. Light amplifying viewer according to claim 1, wherein the switch is operable through an axial displacement of the rotatable operating device along a rotational axis.

3. Light amplifying viewer according to claim 1, wherein the switch is operable through rotation of the rotatable operating device, in that the breaking position corresponds to a certain rotational angular adjustment for the rotatable operating device, in which rotational angular adjustment there is a marked frictional position.

4. Light amplifying viewer according to claim 1, wherein the switch is coupled for switching on and off an IR-light diode.

5. Light amplifying viewer according to claim 2, wherein the switch is coupled for switching on and off an IR-light diode.

6. Light amplifying viewer according to claim 3, wherein the switch is coupled for switching on and off an IR-light diode.

7. A light amplifying viewer, comprising:
   a light amplifier connected to a battery via a switch, the light amplifier having an input plane and an output plane;
   a lens arranged to project a scene received by the lens onto the input plane of the light amplifier;
   one or more eyepieces positioned in optical alignment with the output plane of the light amplifier; and
   a rotatable operating device in rotational operative contact with the switch and coupled to the lens for focus adjustment of the lens upon rotation of the rotatable operating device,
   wherein the rotatable operating device includes a first rotational position in which the switch is in an off position, a second rotational position in which the switch connects the light amplifier to the battery, and a third rotational positional range through which the rotation of the rotatable operating device adjusting the focus of the lens.

8. The viewer of claim 7, wherein the rotatable operating device further comprises a battery holder.

9. The viewer of claim 8, wherein the battery holder is located internal to the rotatable operating device.

10. The viewer of claim 7, wherein an on/off operation of the switch corresponds to rotational movement of the rotatable operating device between the first and second rotational positions.

11. A light amplifying viewer, comprising:
    a light amplifier connectable to a battery;
    a lens arranged to project an image received by the lens onto the light amplifier;
    an eyepiece positioned in viewing alignment with the light amplifier; and
    a lens focusing knob operatively connected to the lens and comprising a switch electrically positioned intermediate the light amplifier and the battery,
    wherein upon rotational movement of the lens focusing knob, the switch is brought into position to electrically connect the battery and the light amplifier and also focusing of the lens is obtained.

12. The viewer of claim 11, wherein the lens focusing knob further comprises a battery holder.

13. The viewer of claim 12, wherein the battery holder is located internal to the lens focusing knob.

14. The viewer of claim 11, wherein an on/off operation of the switch corresponds to rotational movement of the lens focusing knob between a first rotational position and a second rotational position.

* * * * *